United States Patent
Manzoor et al.

(10) Patent No.: US 9,506,523 B2
(45) Date of Patent: Nov. 29, 2016

(54) TORSIONAL VIBRATION DAMPER

(71) Applicants: Suhale Manzoor, Plymouth, MI (US); William J. Piepsney, Canton, MI (US)

(72) Inventors: Suhale Manzoor, Plymouth, MI (US); William J. Piepsney, Canton, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 43 days.

(21) Appl. No.: 14/303,074

(22) Filed: Jun. 12, 2014

(65) Prior Publication Data

US 2015/0362037 A1 Dec. 17, 2015

(51) Int. Cl.
*F16F 15/126* (2006.01)

(52) U.S. Cl.
CPC ................... *F16F 15/126* (2013.01)

(58) Field of Classification Search
CPC ............ F16H 2055/366; F16H 55/36; Y10T 74/2131; F16F 15/126; F16F 7/108; F16F 13/1435; F16F 13/1442
See application file for complete search history.

(56) References Cited

U.S. PATENT DOCUMENTS

| | | | |
|---|---|---|---|
| 1,928,763 A * | 10/1933 | Rosenberg ................. | F16D 3/76 29/450 |
| 3,813,776 A | 6/1974 | Frederickson et al. | |
| 4,083,265 A * | 4/1978 | Bremer, Jr. ......... | F16F 15/1435 74/574.2 |
| 6,171,194 B1 * | 1/2001 | Haga ......................... | F16D 3/52 464/89 |
| 6,386,065 B1 | 5/2002 | Hodjat | |
| 2003/0035966 A1 * | 2/2003 | Tagawa ................. | F16F 15/126 428/450 |
| 2004/0108639 A1 | 6/2004 | Kato et al. | |
| 2005/0116401 A1 * | 6/2005 | Kano .................... | F16F 15/126 267/273 |
| 2009/0145261 A1 | 6/2009 | Obeshaw | |
| 2012/0231909 A1 | 9/2012 | Shin | |
| 2013/0095964 A1 | 4/2013 | Shin | |

FOREIGN PATENT DOCUMENTS

| | | | |
|---|---|---|---|
| FR | 1212234 | 3/1960 | |
| GB | 820042 A1 | 3/1960 | |
| IT | WO 2011141799 A1 * | 11/2011 | ............. F16D 27/10 |
| JP | 2007-255432 | 10/2007 | |
| JP | 2009008237 | 1/2009 | |
| JP | 2009008237 A | 1/2009 | |

OTHER PUBLICATIONS

English Translation of JP 2007255432 (Oct. 4, 2007).

(Continued)

*Primary Examiner* — Bradley King
*Assistant Examiner* — Stephen Bowes
(74) *Attorney, Agent, or Firm* — Thompson Hine LLP

(57) ABSTRACT

A torsional vibration damper is disclosed. The torsional vibration damper comprises a first member having a radially outer surface that comprises a central concave section axially between convex sections and a second member having a radially inner surface that comprises a central convex section axially between concave sections and that opposes said radially outer surface. The radially outer surface and said radially inner surface are separated by a radial gap that defines a cross-sectional profile having an axial center and axial ends, and wherein said radial gap increases in thickness from said axial center to each said axial end of said cross-sectional profile. Alternatively, the first member may include a central convex section axially between concave sections and the second member may include a central concave section between convex section.

17 Claims, 5 Drawing Sheets

(56) References Cited

OTHER PUBLICATIONS

PCT, International Search Report and Written Opinion, PCT/US2015/035574 (Nov. 9, 2015).

Zhang, Chengqi et al.; "Models and Algorithms"; Association Rule Mining, LNAI 2307 Tutorial; ISSN 0302-9743; p. 132, Casual Rule Analysis (2002).

* cited by examiner

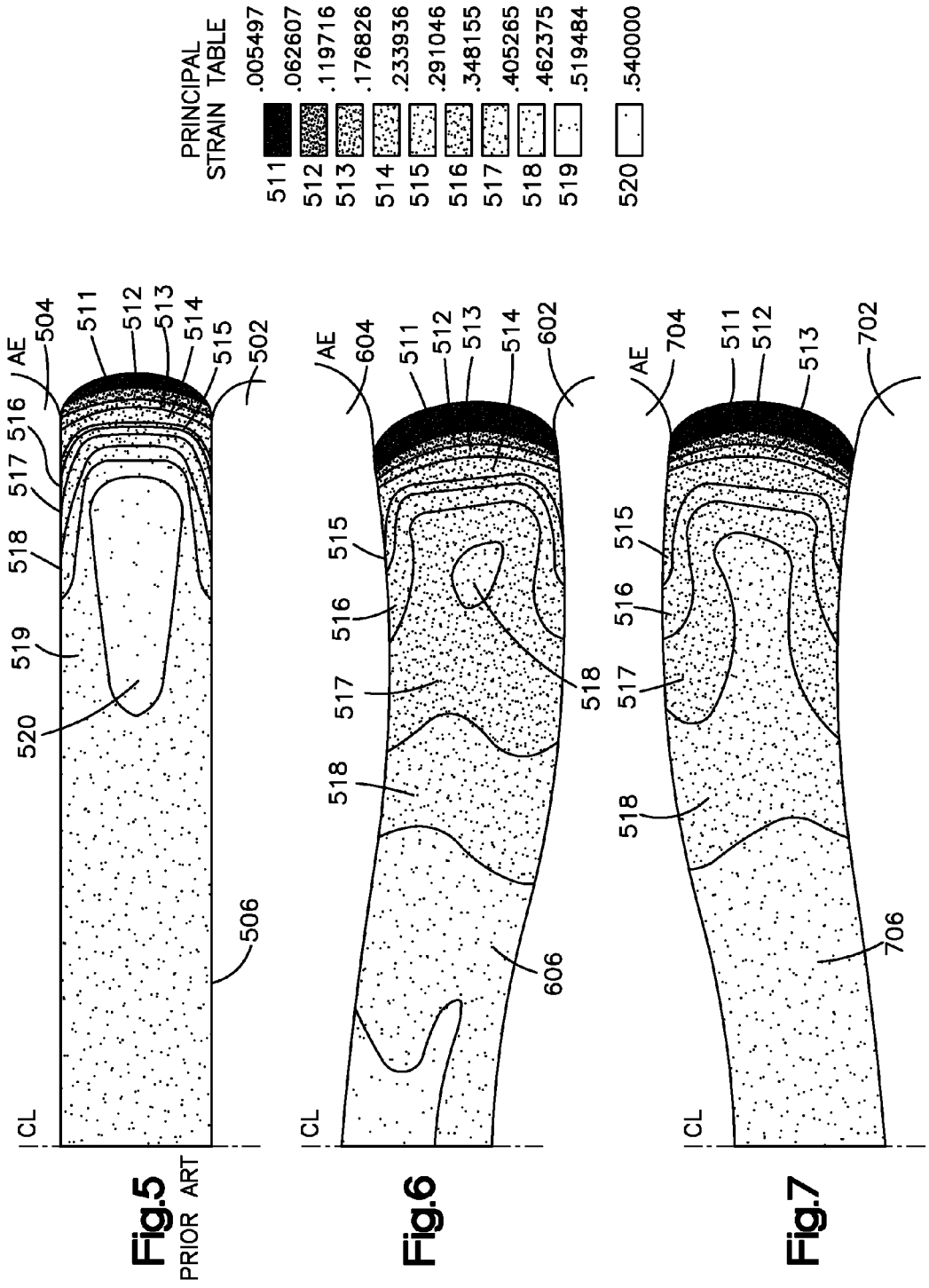

TORSIONAL VIBRATION DAMPER

TECHNICAL FIELD

The present application relates generally to a torsional vibration damper and more particularly to a torsional vibration damper with an undulating or curved profile having an increasing thickness from its center axially towards its periphery in either direction.

BACKGROUND

Torsional vibration dampers usually have straight or parallel curved profiles defined by the innermost diameter of the damper ring, and the outermost diameter of the damper hub (externals mass dampers) or the innermost diameter of the damper hub, and the outermost diameter of the damper ring (internal mass dampers) that accepts a rubber strip or ring. Having straight or parallel curved profiles make the damper susceptible to high tear-drop shaped principal strain buildup at each axial periphery of the rubber fitted in the profile. This unequal (or non-uniform) strain buildup is not desired by design. Furthermore, rectangular profiles may have a better strain response than parallel curved profiles but lack in the axial integrity of the damper which is typically undesirable. Therefore, a balance is sought between axial integrity of the damper and the high principal strain buildup. Accordingly, a torsional vibration damper with a non-parallel curved profile is desired that provides a proper balance between the axial integrity of the damper and the principal strain buildup within the rubber strip or ring.

SUMMARY

In one aspect, a torsional vibration damper is disclosed that includes a first member having a radially outer surface that comprises a central concave section axially between convex sections. Further, the torsional vibration damper includes a second member having a radially inner surface that comprises a central convex section axially between concave sections and that opposes said radially outer surface, wherein said radially outer surface and said radially inner surface are separated by a radial gap that defines a cross-sectional profile having an axial center and axial ends, and wherein said radial gap increases in thickness from said axial center to each said axial end of said cross-sectional profile. A rubber insert is fitted in said radial gap.

In another aspect, a torsional vibration damper is disclosed that includes a first member having a radially outer surface that comprises a central convex section axially between concave sections. Further, the torsional vibration damper includes a second member having a radially inner surface that comprises a central concave section axially between convex sections and that opposes said radially outer surface, wherein said radially outer surface and said radially inner surface are separated by a radial gap that defines a cross-sectional profile having an axial center and axial ends, and wherein said radial gap increases in thickness from said axial center to each said axial end of said cross-sectional profile. A rubber insert is fitted in said radial gap.

In yet another aspect, a torsional vibration damper is disclosed that includes a first member having a centerline and an axis and a radially outer surface having a first length reaching axially between opposite ends. The torsional vibration damper further includes a second member having a second centerline and a radially inner surface opposed to said radially outer surface, wherein said radially inner surface has a second length reaching axially between opposite ends. The gap has a gap length reaching between said opposite ends and a thickness reaching radially between said opposed surfaces that define a cross-sectional profile, wherein said thickness continually increases from a first thickness at said center lines of said members to a second thickness at said opposite ends. A rubber insert is fitted in said radial gap.

BRIEF DESCRIPTION OF THE DRAWINGS

The above and other features of the invention, its nature and various advantages will be more apparent upon consideration of the following detailed description, taken in conjunction with the accompanying drawings.

FIGS. 5-7 illustrate rubber insert principal strains.

DETAILED DESCRIPTION

The following detailed description will illustrate the general principles of the invention, examples of which are additionally illustrated in the accompanying drawings.

Figure 1B:
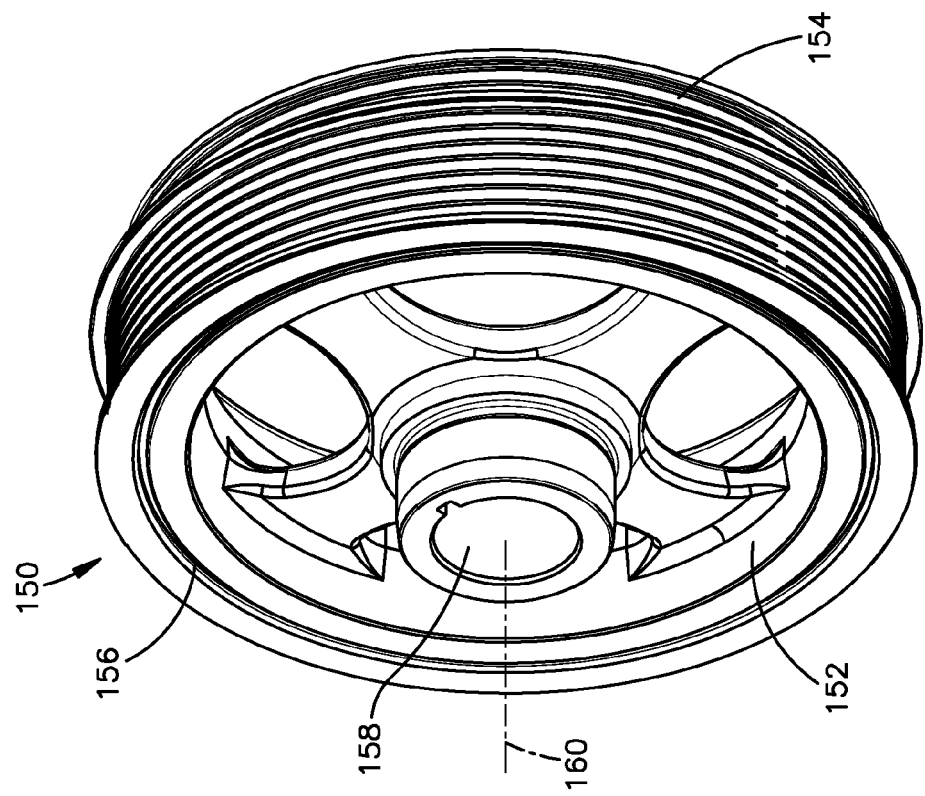
FIGS. 1A-1B are isometric views of torsional vibration dampers.
Figure 1A:
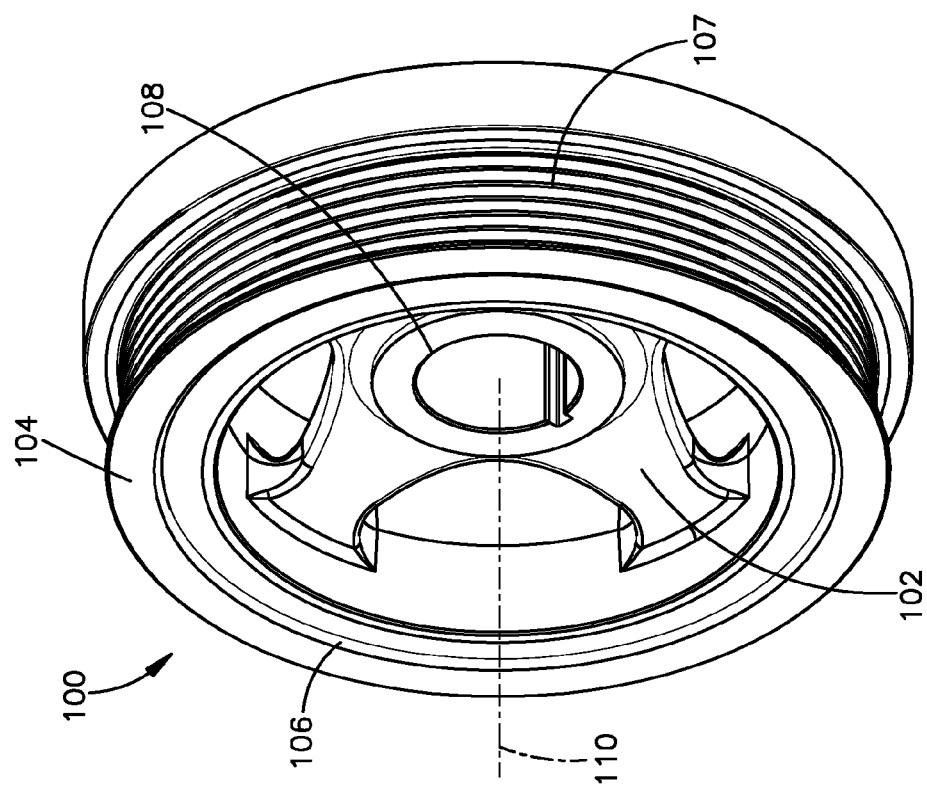

FIG. 1A illustrates an isometric view of a torsional vibration damper 100. The torsional vibration damper 100 includes a hub 102 and a ring 104 that are radially separated by a gap fitted with a rubber insert 106. The ring 104 includes a radially outer grooved surface 107 configured to receive a serpentine belt or the like. The hub 102 includes a center aperture 108 having an axial centerline axis 110. The aperture 108 is configured to securely affix to a shaft (not shown) of a rotating system, e.g., a rotating shaft of an internal combustion engine. FIG. 1B illustrates an isometric view of another torsional vibration damper 150. The torsional vibration damper 150 includes a ring 152 and a hub 154 that are radially separated by a gap fitted with a rubber insert 156. The ring 152 includes a center aperture 158 having an axial centerline axis 160. The aperture 158 is configured to affix to a shaft (not shown) as described above.

Before the rubber insert is fitted in the gap, the rubber insert has a pre-assembly thickness that is greater than the cross-sectional thickness of the gap profile so that the rubber insert goes under compression during insertion or the fitting process. This compressive force that the elastomer exerts on the ring and the hub holds the torsional vibration damper 100 together.

Figure 2:
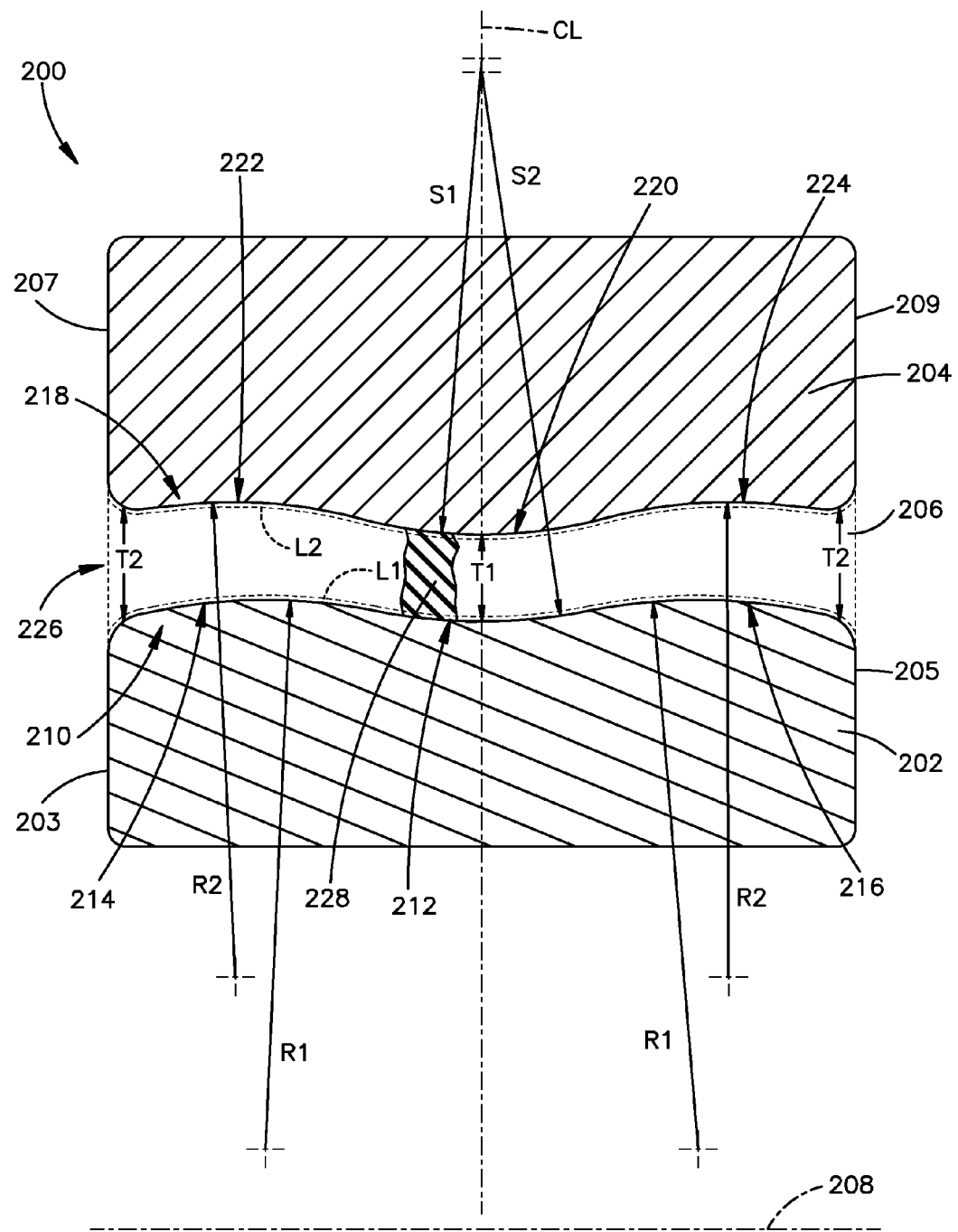
FIG. 2 is a cross-section of a portion of a torsional vibration damper.

FIG. 2 illustrates a cross-section of a portion of a torsional vibration damper 200. The torsional vibration damper 200 includes a first member 202 and a second member 204 that are separated by a radial gap 206. The first member 202 and the second member 204 rotate about an axis 208, e.g., a horizontal axis, of the torsional vibration damper 200 and the second member 204 is radially outward of the first member 202. As illustrated and described in FIGS. 1A-1B, the first member 202 and second member 204 can be a circumferentially extending ring and a circumferentially extending hub, respectively, separated by a gap fitted with a rubber insert. Alternatively, the first member 202 and the second member 204 can be a circumferentially extending hub and a circumferentially extending ring, respectively, separated by a gap fitted with a rubber insert.

In the illustrated embodiment, the first member 202 includes a radially outer surface 210 having a first length L1 reaching between opposite axial ends 203 and 205 of the first member 202. The radially outer surface 210 includes a central concave section 212 and axially adjacent convex sections 214 and 216. In other words, the central concave section 212 is axially between convex sections 214 and 216. Further in the illustrated embodiment, the second member 204 includes a radially inner surface 218 having a second length L2 reaching between opposite axial ends 207 and 209 of the second member 204. The radially inner surface 218 includes a central convex section 220 and concave sections 222 and 224. The central convex section 220 is axially between concave sections 222 and 224. The radially outer surface 210 and the radially inner surface 218 are undulating surfaces that are reciprocally concave-covex, e.g., a convex portion is radially opposed to a concave portion of an opposing surface and/or a concave portion is radially opposed to a convex portion of an opposing surface.

In the illustrated embodiment, the radially outer surface 210 and the radially inner surface 218 are radially opposing surfaces separated by the radial gap 206. The radial gap 206 has a gap length reaching between the opposite axial ends of the first and second members and reaches radially between the opposed surfaces 210 and 218, defining a cross-sectional profile 226 (outlined in dashed lines). The radial gap 206 thickness continuously increases from a first thickness T1 at the centerline CL of the first and second members to a second thickness T2 at each opposite end of the members 202 and 204. The radially outer surface 210 and the radially inner surface 218 have a non-parallel curved relationship. In other words, the first thickness T1 is at the axial center of the cross-sectional profile 226 and the second thickness T2 is axially spaced from the axial center of the cross-sectional profile 226, e.g., the second thickness T2 is axially spaced at or about the axial ends of the cross-sectional profile 226. In the illustrated embodiment, the first thickness T1 is less than the second thickness T2 so that the radial gap 206 continuously increases in thickness between the axial location of the first thickness T1 to the second thickness T2. In another embodiment, the radial gap increases in thickness between the first thickness T1 to the second thickness T2 following an Nth order polynomial relationship, e.g., a 2nd order polynomial relationship. In another embodiment, the radial gap increases in thickness between the first thickness T1 to the second thickness T2 following an inclined relationship. In another embodiment, the radial gap increases in thickness between the first radial thickness T1 to the second radial thickness T2 so that it does not have a single step increase in thickness.

In the illustrated embodiment, the radial gap defined by the cross-sectional profile 226 is fitted with a rubber insert 228 (only partially shown) that radially fits entirely between the radially outer surface 210 and the radially inner surface 218 of the first member 202 and the second member 204, respectively. The rubber insert 228 may be a strip or a ring and made of an elastomeric material, e.g., butyl rubber or the like.

In the illustrated embodiment, the outer convex sections 214 and 216 have a first radius R1 and the outer concave sections 222 and 224 have a second radius R2. The second radius R2 is greater than the first radius R1 plus a fraction F1 (not shown) of the first radial thickness T1 of the radial gap 206, e.g., the fraction F1 can be in the range of 10-90% the thickness of the first thickness T1. Further in the illustrated embodiment, the central convex section 220 has a third radius S1 and the central concave section 212 has a fourth radius S2.

Figure 3:
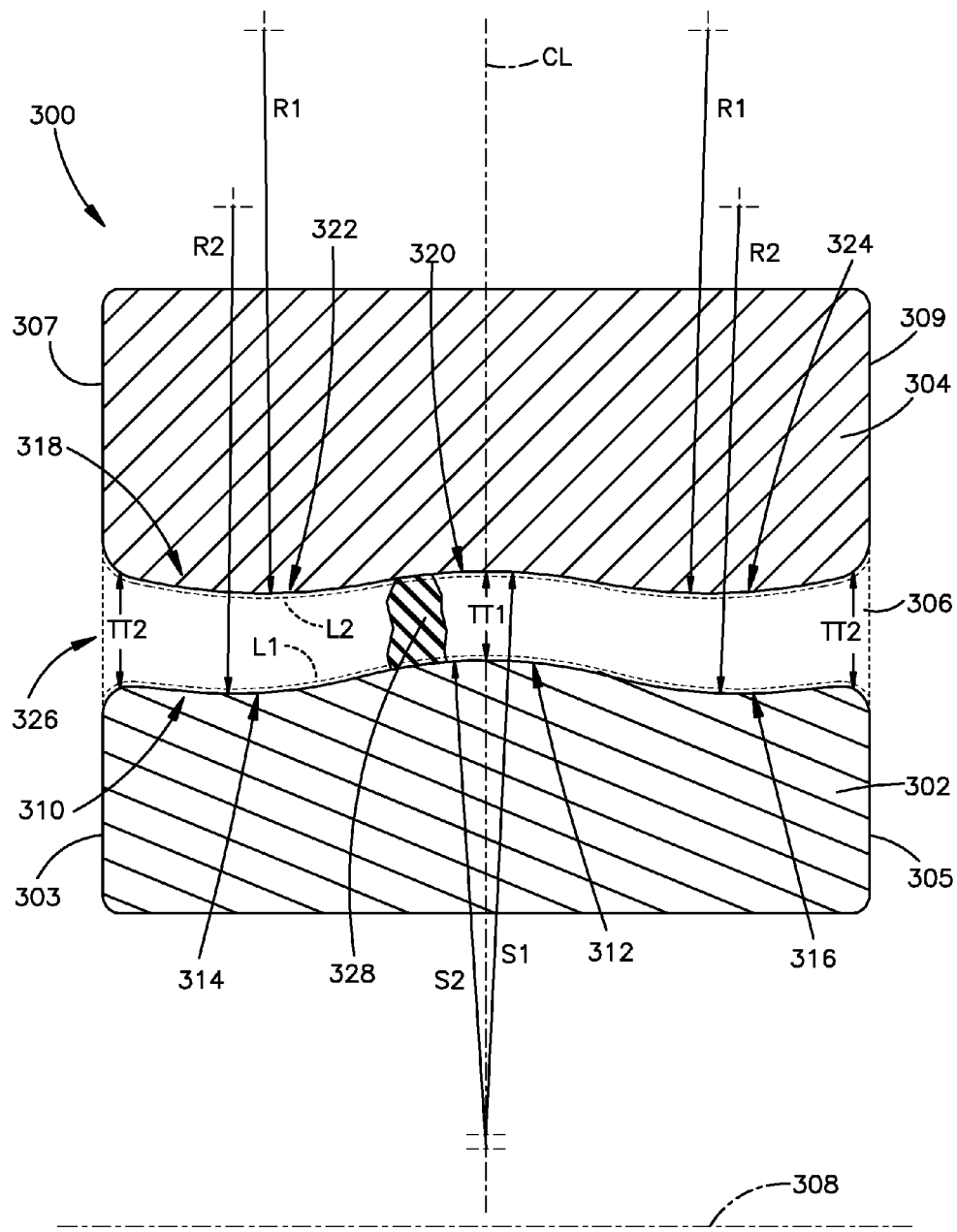
FIG. 3 is another cross-section of a portion of a torsional vibration damper.

FIG. 3 illustrates another cross-section of a torsional vibration damper 300. The torsional vibration damper 300 includes a first member 302 and a second member 304 that are separated by a radial gap 306. The first member 302 and the second member 304 rotate about an axis 308 of the torsional vibration damper 300 and the second member 304 is radially outward of the first member 302. As discussed above, the first and second members circumferentially extend about the axis 308.

In the illustrated embodiment, the first member 302 includes a radially outer surface 310 having a first length L1 reaching between opposite axial ends 303 and 305 of the first member 302. The radially outer surface 310 includes a central convex section 312 and axially adjacent concave sections 314 and 316. In other words, the central convex section 312 is axially between concave sections 314 and 316. Further in the illustrated embodiment, the second member 304 includes a radially inner surface 318 having a second length L2 reaching between opposite axial ends 307 and 309 of the second member 304. The radially inner surface 318 includes a central concave section 320 and convex sections 322 and 324. The central concave section 320 is axially between convex sections 322 and 324. The radially outer surface 310 and the radially inner surface 318 are undulating surfaces that are reciprocally concave-covex, e.g., a convex portion is radially opposite a concave portion of an opposing surface and a concave portion is radially opposite a convex portion of an opposing surface.

In the illustrated embodiment, the radially outer surface 310 and the radially inner surface 318 are radially opposed surfaces separated by the radial gap 306. The radial gap 306 has a gap length reaching between the opposite axial ends of the first and second members and reaches radially between the opposed surfaces 310 and 318, defining a cross-sectional profile 326 (outlined in dashed lines). The radial gap 306 thickness continuously increases from a first thickness TT1 at the centerline CL of the first and second members to a second thickness TT2 at each opposite end of members 302 and 304. The radially outer surface 310 and the radially inner surface 318 have a non-parallel curved relationship. In other words, the first thickness TT1 is at the axial center of the cross-sectional profile 326 and the second thickness TT2 is axially spaced from the axial center of the cross-sectional profile 326, e.g., the second thickness TT2 is axially spaced at or about the axial ends of the cross-sectional profile 326. In the illustrated embodiment, the first thickness TT1 is less than the second thickness TT2 so that the gap 306, e.g., a radial gap, continuously increases in thickness between the axial location of the first thickness TT1 to the second thickness TT2.

In the illustrated embodiment, the radial gap defined by the cross-sectional profile is fitted with a rubber insert 328 (only partially shown) that radially fits entirely between the radially outer surface 310 and the radially inner surface 318. The rubber insert 328 may be a strip or a ring and made of an elastomeric material, e.g., butyl rubber or the like.

In the illustrated embodiment, the outer convex sections 322 and 324 have a first radius R1 and outer concave sections 314 and 316 have a second radius R2. The second radius R2 is greater than the first radius R1 plus a fraction F1 (not shown) of the first thickness TT1 of the radial gap 306, e.g., the fraction F1 can be in the range of 10-90% the thickness of the first thickness T1. Further in the illustrated embodiment, the central concave section 320 has a third radius S1 and the central convex section 312 has a fourth radius S2.

Figure 4:
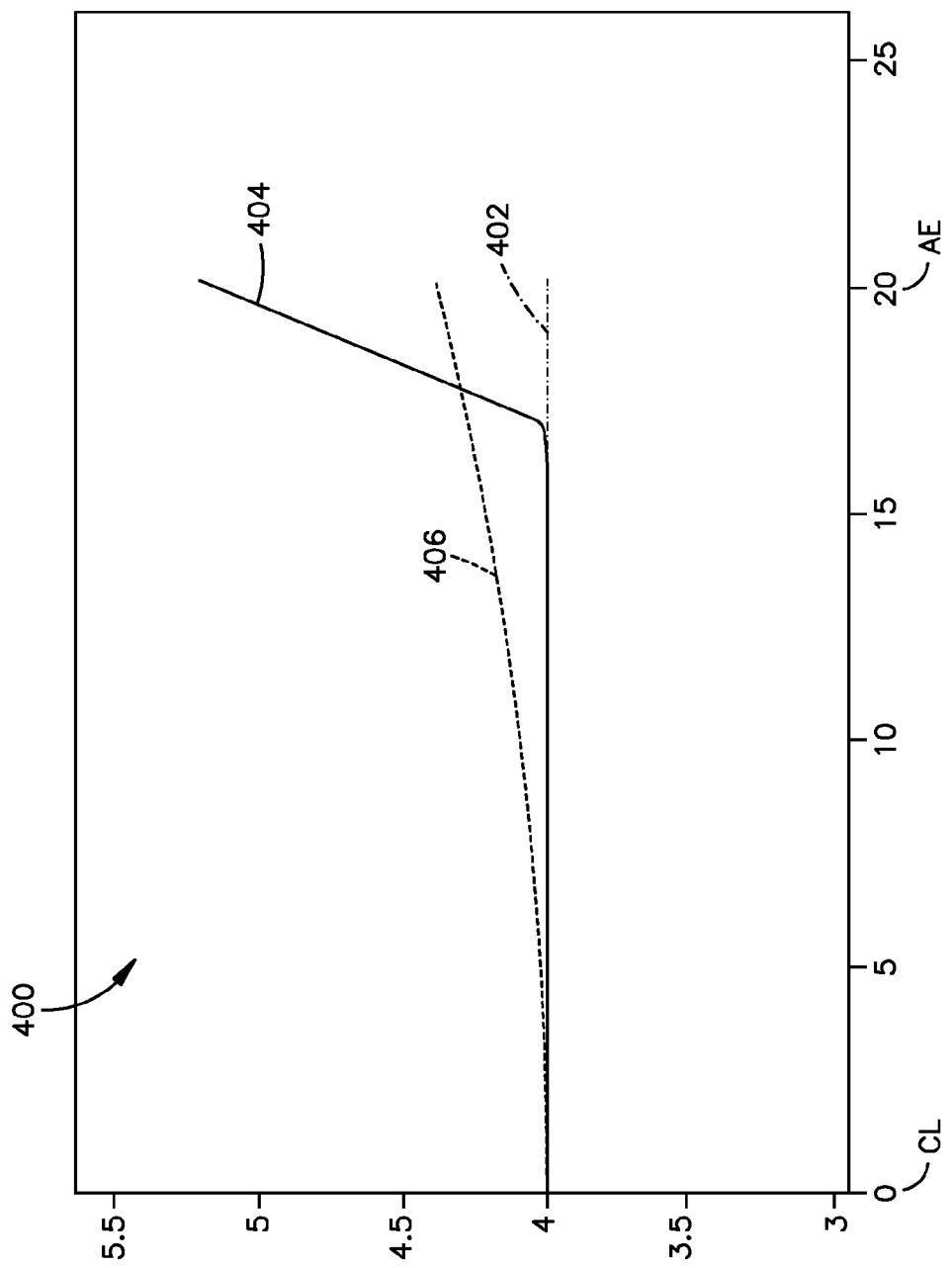
FIG. 4 is a graph of torsional vibration damper gap thicknesses.

FIG. 4 illustrates a graph 400 of gap thickness plots of three torsional vibration damper profiles from a centerline CL to an axial edge AE. The radial gap of the torsional vibration dampers discussed herein do not have a constant thickness. For example, gap thickness plot 402 is shown as having a constant gap thickness of 4.0 across the axial length (from 0 to 20 on the horizontal axis). Further, the radial gap of the torsional vibration dampers discussed herein do not have a step increase in gap thickness at only one location. For example, gap thickness plot 404 is shown as having a gap thickness that step increases at only one location along its axial length, i.e., gap thickness plot 404 is shown as having a gap thickness of 4.0 up to a point where it step increases at only one location to 5.2. The torsional vibration dampers discussed herein have a continuously increasing gap thickness that continuously increases from at or about the centerline CL to each axial edge AE, for example, gap thickness plot 406 illustrates that the gap thickness continuously increases from 4.0 to 4.6 between the centerline CL and the axial edge AE. As described above, the continuously increasing gap thickness may have a Nth order polynomial relationship, an inclined relationship, and the like.

FIGS. 5-7 illustrates the principal strains of the rubber insert fitted in the gap of torsional vibration dampers (only one half of the insert is shown, from centerline CL to axial edge AE). The strain designations 511-520 represent a range of principal strains. Designation 511 represents the lowest principal strain and designation 520 represents the greatest principal strain, as shown in detail in the Principal Strain Table to the right of FIGS. 5-7. Specifically, FIG. 5 illustrates an example strain profile of a rubber insert 506 disposed between a first member 502 and a second member 504 having a straight gap profile, as is typical in the prior art. FIG. 6 illustrates an example strain profile of a rubber insert 606 disposed between a first member 602 and a second member 604, similar to the example embodiment discussed above in FIG. 3. FIG. 7 illustrates an example strain profile of a rubber insert 706 disposed between a first member 702 and a second member 704, similar to the example embodiment discussed above in FIG. 2.

FIG. 5 illustrates that the prior art straight gap profile design exhibits greater principal strain towards the axial end AE where a tear-drop principal strain value 520 is shown. High principal strains towards the axial ends may not be an ideal design as it may lead to wear of the rubber insert in the torsional vibration damper. FIGS. 6-7 illustrate that the torsional vibration damper embodiments described above in FIGS. 2 and 3 (undulating radially inner and radially outer surfaces or surfaces having a non-parallel curved relationship) reduce the maximum principal strain in the rubber insert, essentially reducing the wear of the rubber insert in the torsional vibration damper.

The embodiments of this invention shown in the drawings and described above are exemplary of numerous embodiments that may be made within the scope of the appended claims. It is contemplated that numerous other configurations may be created taking advantage of the disclosed approach. In short, it is the applicant's intention that the scope of the patent issuing herefrom be limited only by the scope of the appended claims.

What is claimed is:

1. A torsional vibration damper comprising:
a first member having a radially outer surface that comprises a central concave section axially between convex sections;
a second member having a radially inner surface that comprises a central convex section axially between concave sections and that opposes said radially outer surface, wherein said radially outer surface and said radially inner surface are separated by a radial gap that defines a cross-sectional profile having an axial center and axial ends, and wherein said radial gap gradually, continuously increases in thickness along the length of the radial gap from said axial center to each said axial end of said cross-sectional profile; and
a rubber insert fitted in said radial gap.

2. A torsional vibration damper of claim 1, wherein said first member is a hub and said second member is a ring.

3. A torsional vibration damper of claim 1, wherein said first member is a ring and said second member is a hub.

4. A torsional vibration damper comprising:
a first member having a radially outer surface that comprises a central convex section axially between concave sections;
a second member having a radially inner surface that comprises a central concave section axially between convex sections and that opposes said radially outer surface, wherein said radially outer surface and said radially inner surface are separated by a radial gap that defines a cross-sectional profile having an axial center and axial ends, and wherein said radial gap gradually, continuously increases in thickness along the length of the radial gap from said axial center to each said axial end of said cross-sectional profile; and
a rubber insert fitted in said radial gap.

5. A torsional vibration damper of claim 4, wherein said first member is a hub and said second member is a ring.

6. A torsional vibration damper of claim 4, wherein said first member is a ring and said second member is a hub.

7. A torsional vibration damper comprising:
a first member having a centerline and an axis and a radially outer surface having a first length reaching axially between opposite ends;
a second member having a second centerline and a radially inner surface opposed to said radially outer surface, wherein said radially inner surface has a second length reaching axially between opposite ends;
a gap having a gap length reaching between said opposite ends and a thickness reaching radially between said opposed surfaces that define a cross-sectional profile, wherein said thickness gradually, continually increases along the gap length from a first thickness at said center lines of said members to a second thickness at each of said opposite ends; and
a rubber insert fitted in said radial gap;
wherein the radially outer surface and the radially inner surface are undulating surfaces that are reciprocally concave-convex with at least one concave-convex pair axially left of the centerline and at least one concave-convex pair axially right of the centerline.

8. A torsional vibration damper of claim 7, wherein said radially outer surface comprises a central convex section and axially adjacent concave sections, and wherein said radially inner surface comprises a central concave section and axially adjacent convex sections.

9. A torsional vibration damper of claim 8, wherein said axially adjacent concave sections have a first radius and said axially adjacent concave sections have a second radius, wherein said second radius is greater than a sum of said first radius and a fraction of said first thickness.

10. A torsional vibration damper of claim 8, wherein said first member is a hub and said second member is a ring.

11. A torsional vibration damper of claim 8, wherein said first member is a ring and said second member is a hub.

12. A torsional vibration damper of claim 7, wherein said radially outer surface comprises a central concave section and axially adjacent convex sections, and wherein said radially inner surface comprises a central convex section and axially adjacent concave sections.

13. A torsional vibration damper of claim 12, wherein said axially adjacent convex sections have a first radius and said axially adjacent concave sections have a second radius, wherein said second radius is greater than a sum of said first radius and a portion of said first thickness.

14. A torsional vibration damper of claim 12, wherein said first member is a hub and said second member is a ring.

15. A torsional vibration damper of claim 12, wherein said first member is a ring and said second member is a hub.

16. A torsional vibration damper of claim 7, wherein said radially outer surface and said radially inner surface are reciprocally concave-convex.

17. A torsional vibration damper of claim 7, wherein said thickness continuously increases following a polynomial relationship.

* * * * *